US012396076B1

(12) United States Patent
Xu et al.

(10) Patent No.: US 12,396,076 B1
(45) Date of Patent: Aug. 19, 2025

(54) LED DRIVE SYSTEM AND LED LAMP THEREOF

(71) Applicant: GUANGDONG SNC TECHNOLOGY CO., LTD., Zhongshan (CN)

(72) Inventors: Jianyong Xu, Zhongshan (CN); Kunpeng Tang, Zhongshan (CN); Liang Wang, Zhongshan (CN); Xuangang Hou, Zhongshan (CN)

(73) Assignee: GUANGDONG SNC TECHNOLOGY CO., LTD., Zhongshan (CN)

( * ) Notice: Subject to any disclaimer, the term of this patent is extended or adjusted under 35 U.S.C. 154(b) by 0 days.

(21) Appl. No.: 19/023,489

(22) Filed: Jan. 16, 2025

(51) Int. Cl.
*H05B 47/10* (2020.01)
*H05B 45/14* (2020.01)
*H05B 47/17* (2020.01)

(52) U.S. Cl.
CPC ............. *H05B 45/14* (2020.01); *H05B 47/17* (2020.01)

(58) Field of Classification Search
CPC ........ H05B 45/14; H05B 45/30; H05B 47/00; H05B 47/10; H05B 47/17
See application file for complete search history.

(56) References Cited

U.S. PATENT DOCUMENTS

2013/0193877 A1* 8/2013 Kuo .................... H05B 45/375 315/307
2017/0188421 A1* 6/2017 Motomura ............ H05B 47/19
2020/0100348 A1* 3/2020 Xiong .................... H05B 45/20
2021/0153312 A1* 5/2021 Ren ........................ H05B 45/10

* cited by examiner

*Primary Examiner* — Thai Pham
(74) *Attorney, Agent, or Firm* — Hemisphere Law, PLLC; Zhigang Ma

(57) ABSTRACT

The present disclosure provides an LED drive system and an LED lamp thereof, the LED drive system configured to drive and control a light board and including: a dimming drive power supply configured to output at least two drive signals according to its own working driving modes; an adjusting module configured to output an adjusting trigger signal and having at least two adjusting gears, each of the at least two adjusting gears corresponding to a driving mode; a control output module configured to output a plurality of adjusting trigger signals to the dimming drive power supply according to a plurality of adjusting gears, the plurality of adjusting signals corresponding to the plurality of adjusting trigger signals one by one. The dimming drive power supply switches its own driving mode according to the adjusting signal, and outputs a drive signal corresponding to the driving mode to the light board.

13 Claims, 6 Drawing Sheets

LED DRIVE SYSTEM AND LED LAMP THEREOF

TECHNICAL FIELD

The present disclosure relates to the field of illumination devices, and especially relates to an LED drive system and an LED lamp thereof.

BACKGROUND

An LED lamp requires an LED drive system configured to control a luminous intensity, a color temperature, a dimming mode and a lighting strategy of the LED lamp based on controlled information thereof. The controlled information mainly comes from a control end that communicates with the LED drive system to control an output voltage and a current of the LED drive system.

At present, connection and control modes for the LED lamp mainly include below.

Firstly, a 1.0-10V constant voltage dimming mode; the 0-10V dimming mode is configured to uniformly adjust all light beads of an illumination circuit, and adjust an illumination intensity according to an output voltage thereof, which can achieve an infinite adjustment thereof.

Secondly, A Digital Addressable Lighting Interface (DALI) mode; the DALI dimming mode has strong compatibility, for allowing digital control switches, sensors, regulators and a plurality of lamps connected on a connecting branch in series and in parallel, which can enable a single control and an adjusting of each lamp and is compatible with a plurality of types of lamps and sensors.

Thirdly, a Multiple Digital Transmission (DMX) mode; the DMX-RDM dimming mode is a bidirectional digital communication based on a DMX, and also is a standard protocol for a digital communication network, which is commonly configured to control stages and effects. Compared with conventional analog dimming systems, digital lighting systems based on a DMX512 control protocol can provide powerful control functions for large and medium-sized indoor and outdoor LED lighting systems.

However, the above different connection and control modes result in different voltages and currents output by a drive power supply after being connected to the drive power supply. These differences include: different drive voltages and different drive currents for driving LED lamps to be lit up, and different control voltages and different control currents for controlling LED lamps. It is impossible to obtain compatibility between the above three control modes by using one drive power supply in the related art, resulting in a decrease in compatibility of the drive system with the drive power supply. In a production stage, different types of LED lamps require to develop different drive systems, even though light boards of these LED lamps are the same, which results in redundant development and a waste of labors and material costs.

SUMMARY

The technical problems to be solved: in view of the shortcomings of the related art, an objective of the present disclosure is to provide an LED drive system and an LED lamp thereof which can solve technical problems that a drive system in the related art can't be compatible with a plurality different control modes.

An LED drive system according to an embodiment of the present disclosure is configured to drive and control a light board and includes:

a dimming drive power supply configured to output at least two drive signals according to its own working driving modes;

an adjusting module having at least two adjusting gears and configured to send an adjusting trigger signal after being shifted to one of the at least two adjusting gears, each of the at least two adjusting gears corresponding to a driving mode;

a control output module configured to output a plurality of adjusting signals corresponding to a plurality of adjusting trigger signals one-to-one based on the plurality of adjusting trigger signals, and send a corresponding adjusting signal in the plurality of adjusting signals to the dimming drive power supply;

the light board electrically connected to the dimming drive power supply; and wherein the dimming drive power supply switches its own driving mode according to the corresponding adjusting signal in the plurality of adjusting signals, and outputs a drive signal corresponding to the driving mode to the light board, so that the light board works in the corresponding driving mode, thereby achieving compatibilities with multiple different dimming driving modes.

The LED drive system of the present disclosure can output different adjusting trigger signals according to a control of the adjusting module, the control output module configured to detect the adjusting trigger signal and output an adjusting signal corresponding to the adjusting trigger signal to the dimming drive power supply, the dimming drive power supply configured to switch its own driving mode according to the adjusting signal and output a driving signal corresponding to the driving mode to drive the light board, thereby achieving the purpose that the driving mode of the light board can be controlled to be selected by the adjusting module. The adjusting module has a plurality of adjusting gears, each of the plurality of adjusting gears corresponding to one driving mode. By adjusting the adjusting module, compatibility issues of driving the light board can be solved. For example, after connecting the dimming drive power supply to the light board, the driving mode of the light board can be selected according to customer's needs, such as selecting the 0-10V dimming driving mode. Before the dimming drive power supply is powered on, or after the dimming drive power supply is powered on but before starting to drive the light board, the adjusting module is adjusted to the corresponding adjusting gear that is marked with the 0-10V dimming driving mode, and then the dimming drive power supply starts to work to drive the light board, at this time, the light board can start to work in the manner of the 0-10V dimming driving mode. Similarly, when the light board needs to be connected or set according to other driving modes, such as a DALI driving mode, before the light board lights up, it only needs to adjust the adjusting module to the corresponding adjusting gear that is marked with the DALI driving mode. The LED drive system of the present disclosure is easy to be operated and can adapt to various driving modes.

DETAILED DESCRIPTION

Reference will now be made in detail to embodiments, examples of which are illustrated in the accompanying drawings.

Figure 1:
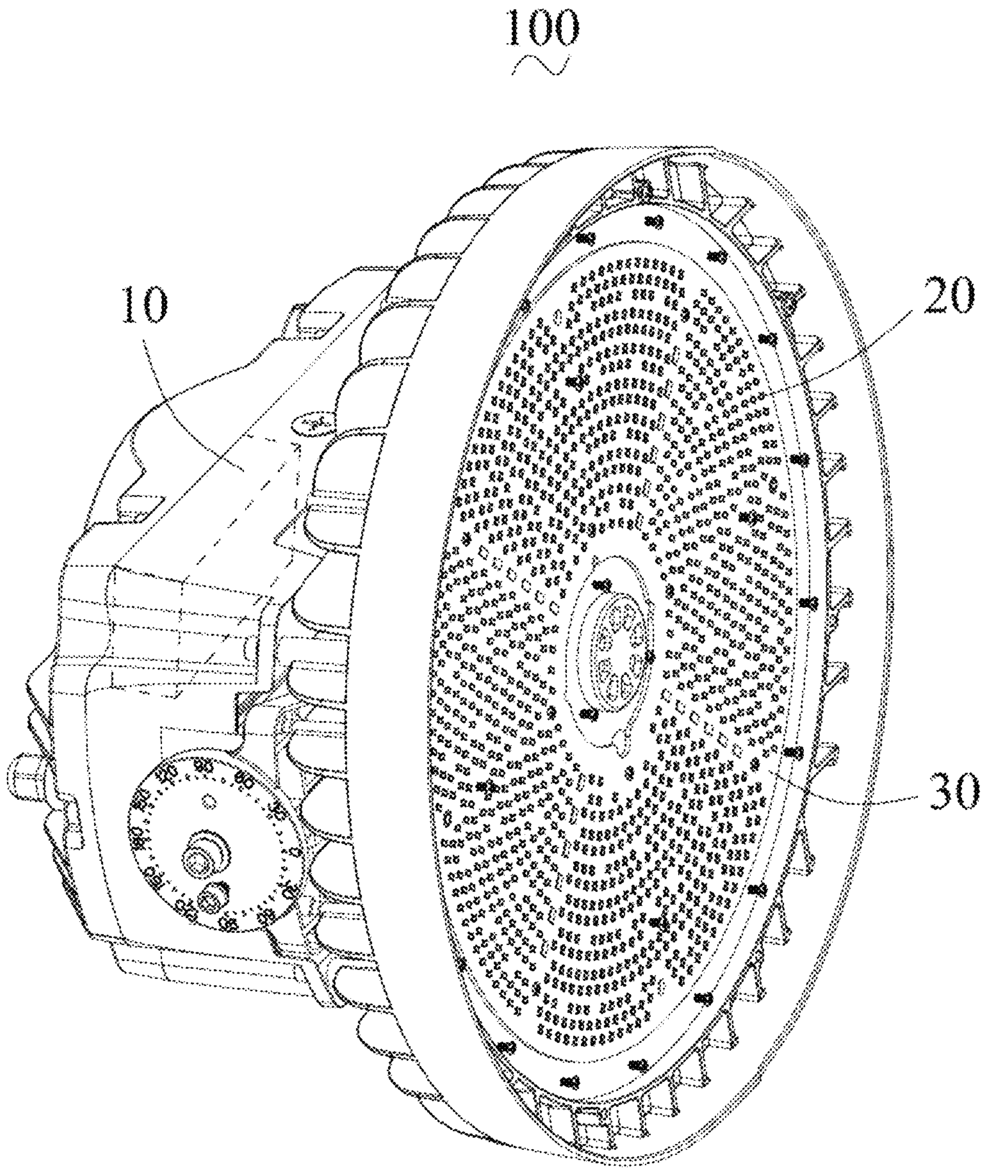
FIG. 1 is a schematic view of an LED lamp in accordance with an embodiment of the present disclosure.
Figure 2:
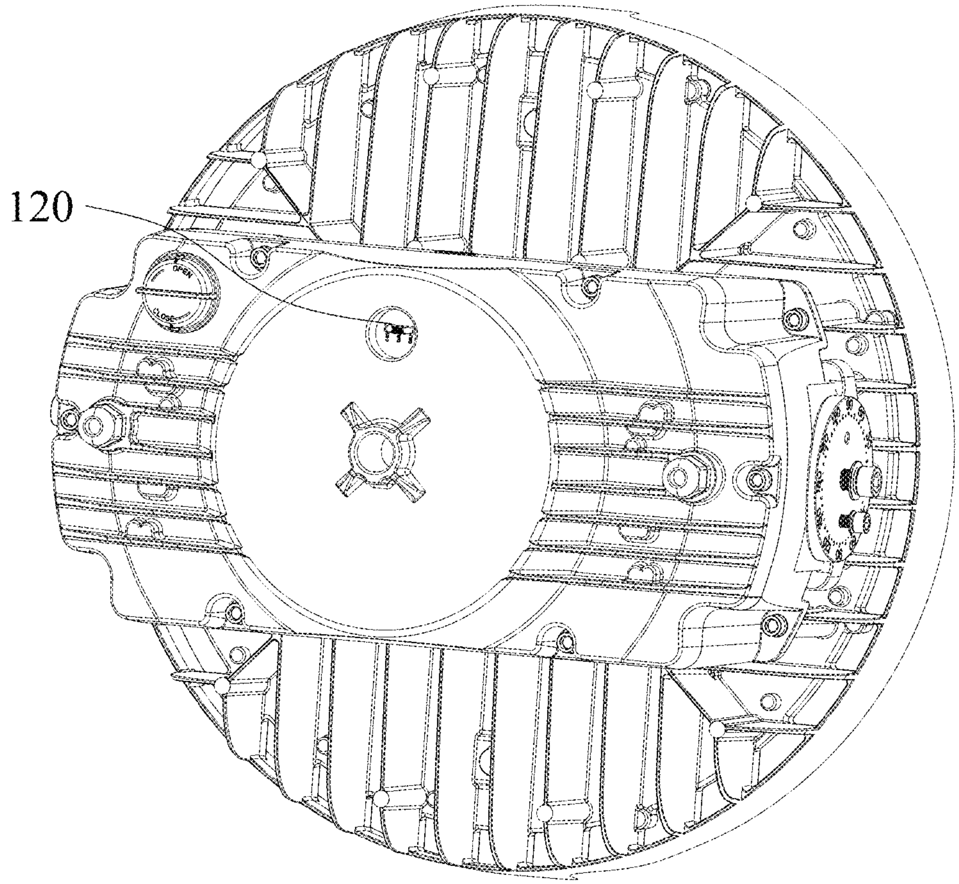
FIG. 2 is similar to FIG. 1, but shown from a back view.

Referring to FIG. 1 and FIG. 2, an LED lamp 100 according to an embodiment of the present disclosure includes an LED drive system 10 and a plurality of lighting beads 20. The LED drive system 10 is configured to drive the plurality of lighting beads 20 to light up for illumination, and to control driving modes of the plurality of lighting beads 20.

Figure 3:
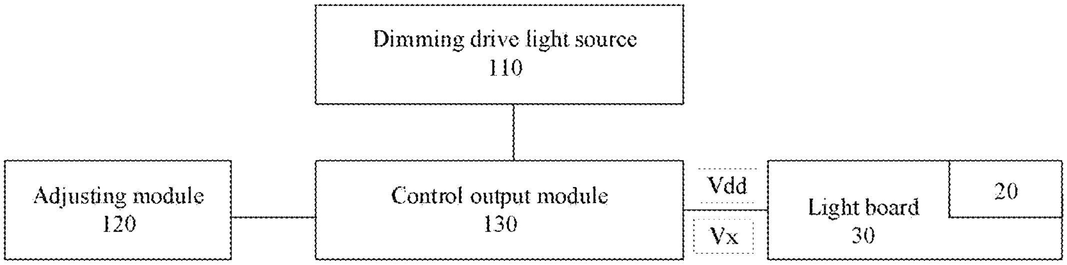
FIG. 3 and FIG. 4 are schematic diagrams of an LED drive system in accordance with an embodiment of the present disclosure.

Referring to FIG. 3, the LED drive system 10 includes: a dimming drive power supply 110, an adjusting module 120, a control output module 130 and a light board 30, wherein the LED beads 20 are installed on the light board 30.

In the present disclosure, the dimming drive power supply 110 is configured to output a constant voltage Vdd and output at least two drive signals Vx according to its own working driving modes. The adjusting module 120 has at least two adjusting gears and configured to send an adjusting trigger signal a after being shifted to one of the at least two adjusting gears, each of the at least two adjusting gears corresponding to a driving mode. The control output module 130 is configured to output a plurality of adjusting signals b corresponding to a plurality of adjusting trigger signals a one-to-one based on the plurality of adjusting trigger signals a, and send a corresponding adjusting signal b to the dimming drive power supply 110 based on the adjusting trigger signal a. The light board 30 is electrically connected to the dimming drive power supply 110.

The dimming drive power supply 110 switches its own driving mode according to the adjusting signal b, and outputs the drive signal Vx corresponding to the driving mode to the light board 30, so that the plurality of lighting beads 20 of the light board 30 works in the corresponding driving mode.

The LED drive system 100 of the present disclosure can be adjusted to different adjusting gears through the adjusting module 120 according to a required driving mode of the light beads 20, and send the adjusting trigger signal a. When the adjusting trigger signal a is transmitted to the control output module 130, the control output module 130 detects the adjusting trigger signal a and then determines the driving mode corresponding to the adjusting trigger signal a, and outputs the adjusting signal b to the dimming drive power supply 110 according to a pre-set control strategy. The dimming drive power supply 110 drives the light beads 20 to light up according to the pre-set driving mode based on the adjusting signal b, thereby achieving compatibilities with multiple different dimming driving modes.

The adjusting module 120 has a plurality of adjusting gears, each of the plurality of adjusting gears corresponding to one driving mode. By adjusting the adjusting module 120, compatibility issues of switching working modes of the dimming drive power supply 110 and driving the light board 30 can be solved. For example, after connecting the dimming drive power supply 110 to the light board 30, the driving mode of the light board 30 can be selected according to customer's needs, such as selecting the 0-10V dimming driving mode. Before the dimming drive power supply 110 is powered on, or after the dimming drive power supply 110 is powered on but before starting to drive the light board 30, the adjusting module 120 is adjusted to the corresponding adjusting gear that is marked with the 0-10V dimming driving mode, and then the dimming drive power supply 110 receives the adjusting signal of the control output module 130 and switches to the corresponding driving mode according to the adjusting signal, the dimming drive power supply starts to work to drive the light board 30, at this time, the light board 30 can start to work in the manner of the 0-10V dimming driving mode. Similarly, when the light board 30 needs to be connected or set according to other driving modes, such as a DALI driving mode, before the light board 30 lights up, it only needs to adjust the adjusting module 120 to the corresponding adjusting gear that is marked with the DALI driving mode. The LED drive system 10 of the present disclosure is easy to be operated and can adapt to various driving modes.

Figure 4:
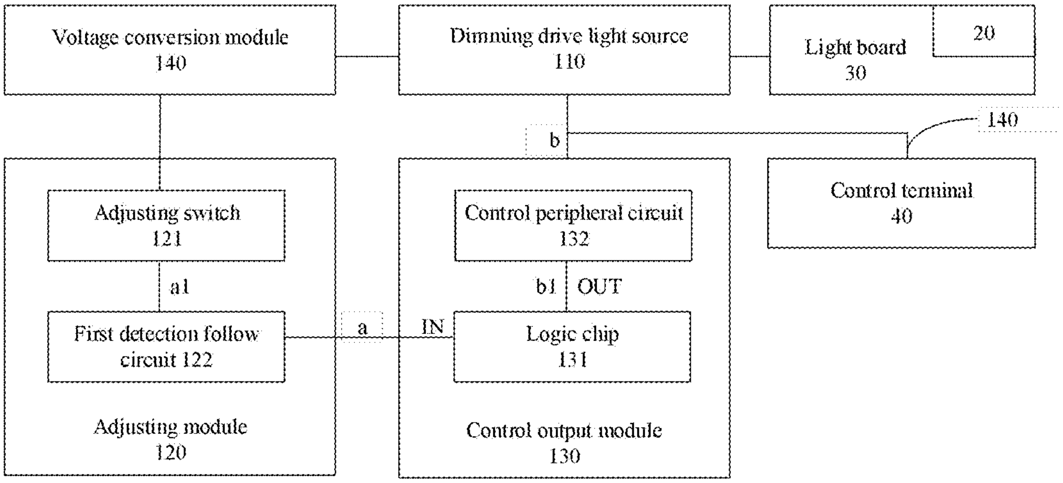

Referring to FIG. 4, the adjusting module 120 includes an adjusting switch 121 and a first detection following circuit 122.

The adjusting switch 120 includes the at least two adjusting gears, each of the at least two adjusting gears configured to conduct and connect different circuits, so that the adjusting switch 120 outputs different adjusting voltages al. The first detection following circuit 122 is electrically connected between the adjusting switch 120 and the control output module 130, and configured to perform impedance isolation and filtering on the adjusting voltage al to output the adjusting trigger signal a.

Referring to FIG. 4, in the present disclosure, the control output module 130 includes: a logic chip 131 and a control peripheral circuit 132.

The logic chip 131 with a preset control strategy, includes an input terminal IN and an output terminal OUT, wherein the input terminal IN is configured to receive the adjusting trigger signal a, and the output terminal OUT is configured to detect the adjusting trigger signal a according to the control strategy and output a corresponding intermediate signal b1 based on a detection result thereof. The control peripheral circuit 132 is configured to receive the intermediate signal b1, convert the intermediate signal b1 into the adjusting signal b, and then send the adjusting signal b to the dimming drive power supply 110.

That is to say, signal variation in the present disclosure is as follows.

After the adjusting switch 121 is manually adjusted to output a regulation voltage al which corresponds to different driving modes; the first detection following circuit 122 processes the regulation voltage al, which mainly includes impedance isolation and filtering, to output the adjusting trigger signal a that is stable and detectable. The logic chip 131 receives the adjusting trigger signal a and detects the adjusting trigger signal a, and sends the corresponding intermediate signal b1 according to the pre-set internal control strategy based on a size of the trigger signal a. Similarly, a size or information carried by the intermediate signal b1 corresponds to the driving mode, different sizes or information carried by the intermediate signal b1 correspond to different driving modes. And then, the control peripheral circuit 132 is to process the intermediate signal b1, which mainly includes performing impedance matching voltage tracking and electrical isolation. Afterwards, the control peripheral circuit 132 is configured to output the adjusting signal b corresponding to the intermediate signal b1 to the dimming drive power supply 110. The dimming drive power supply 110 outputs a driving voltage and/or a control voltage Vx to the LED beads 20 according to the corresponding driving mode based on the adjusting signal and the preset control strategy internally, thereby achieving a purpose that the LED beads 20 works according to the corresponding driving mode.

It should be noted that the regulation voltage al that is output by the adjusting switch 121 is a continuous level signal, and different regulation voltages al have different level amplitudes, such as 5V or 4V continuous levels; similarly, because the first detection following circuit 122 receives a level signal, the output adjusting trigger signal a is also a level signal. After receiving the adjusting trigger signal a, the logic chip 131 detects the adjusting trigger signal a, and the intermediate signal b1 that is output according to the preset control strategy can be a level signal. Of course, according to requirements of the dimming drive power supply 110 to be controlled, it can also be: control signals with rising edges or falling edges, high and low level signals with specific switching times, square wave signals and triangular wave signals, etc., which have their own special identifiers, carry control information, and the intermediate signals b1 that can be uniquely identified. The intermediate signals b1 can be recognized by the dimming drive power supply 110. And based on characteristics of the intermediate signal b1 that is received, the control peripheral circuit 132 also outputs a corresponding signal that is more stable, non-attenuated and easy to be identified, that is, the adjusting signal b.

In an embodiment of the present disclosure, the adjusting switch 121 has two adjusting gears. Of course, in another embodiment of the present disclosure, the adjusting switch 121 can have three adjusting gears, which are a first gear S1, a second gear S2, and a third gear S3. When the adjusting switch 121 is adjusted to different adjusting gears S, different regulation voltages al are output. After the different regulation voltages al pass through the first detection and following module 121, different corresponding adjusting trigger signals a are also output.

The dimming drive power supply 110 provides three driving modes, which are: a Digital Addressable Lighting Interface (DALI) dimming mode; a Digital MultipleX RDM (DMX-RDM) dimming mode and a 0-10V linear dimming mode.

When the adjusting switch 121 is adjusted to the first gear S1, the dimming drive power supply 110 works in the Digital Addressable Lighting Interface (DALI) dimming mode.

When the adjusting switch 121 is adjusted to the second gear S2, the dimming drive power supply 110 works in the Digital MultipleX RDM (DMX-RDM) dimming mode.

When the adjusting switch 121 is adjusted to the third gear S2, the dimming drive power supply 110 works in the 0-10V linear dimming mode.

The dimming drive power supply 110 works in different driving modes to output different driving signals Vx, at the same time, the dimming drive power supply 110 can also receive signal inputs from different external devices according to its own driving mode, such as inputs of sensors, other control switches and infrared controllers etc., so as to cooperate with external devices to perform dimming control corresponding to a current driving mode.

In the present disclosure, one of the control strategies of the logic chip 131 includes: detecting a value of a voltage V of the adjusting trigger signal a, and comparing the voltage V of the adjusting trigger signal a with two preset threshold voltages (V01, V02, V01≤V02), and outputting the intermediate signals b1 (respectively corresponding to voltages V11, V12, V13) with different magnitudes based on comparison results. Similarly to the previous description, the intermediate signal b1 mentioned here can be a continuous level signal, a signal with a rising edge or a falling edge, a high and low level signal with a specific switching time, a square wave signal and a triangular wave signal etc., which have their own special identifiers and can be uniquely identified. These signals can be recognized by the dimming drive power supply 110.

a. when V<V01, outputting the intermediate signal V11, at this time, the control peripheral circuit 132 outputs the adjusting signal bx, which is corresponding to the dimming drive power supply 110 that works in the Digital Addressable Lighting Interface (DALI) dimming mode to output the control signal Vx of the first signal C1 to drive the LED beads 20.

b. when V01≤V≤V02, outputting the intermediate signal V12, at this time, the control peripheral circuit 132 outputs the adjusting signal by, which is corresponding to the dimming drive power supply 110 that works in the Digital MultipleX RDM (DMX-RDM) dimming mode to output the control signal Vx of the second signal C2 to drive the LED beads 20.

c. when V02<V, outputting the intermediate signal V13, at this time, the control peripheral circuit 132 outputs the adjusting signal bz, which is corresponding to the dimming drive power supply 110 that works in the 0-10V linear dimming mode to output the control signal Vx of the third signal C3 to drive the LED beads 20.

Figure 5:
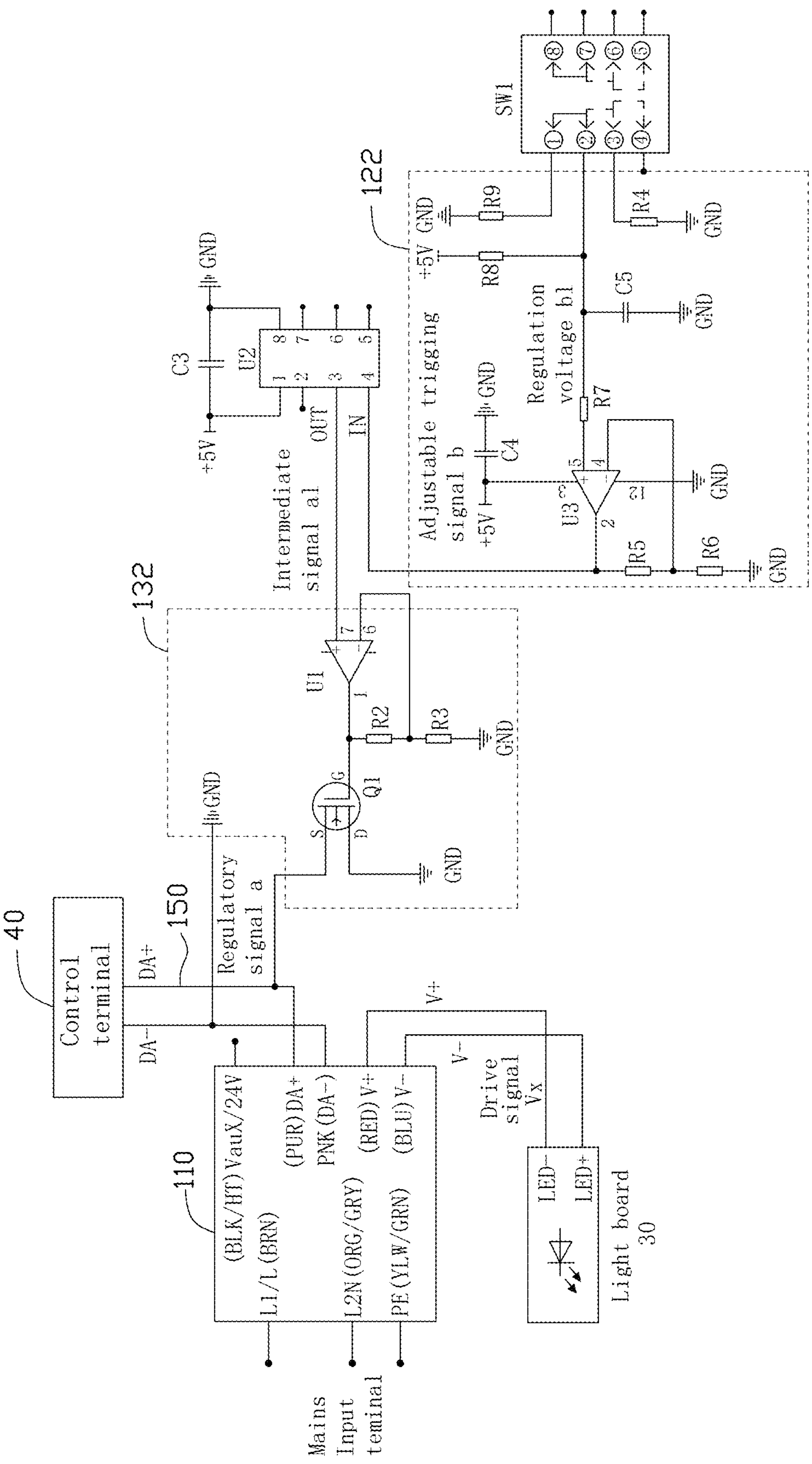
FIG. 5 is a circuit diagram of the LED drive system of the present disclosure.

In the present disclosure, the value of the voltage V of the adjusting trigger signal a corresponds to a difference in the resistance of a circuit that is connected by the adjusting switch 121, which is specifically as shown in FIG. 5.

The adjusting switch 121 includes a first pin 1, a second pin 2 and a third pin 3.

The first detection following circuit 122 includes: a first resistor R9, a second resistor R4, a third resistor R8, a first capacitor C5 and a first operational amplifier U3.

One end of the first resistor R9 is connected to the first pin 1 and the other end of the first resistor R9 is grounded, one end of the second resistor R4 connected to the third pin 2 and the other end of the second resistor R4 grounded, one end of the third resistor R8 connected to the second pin and the other end of the third resistor R8 connected to a constant voltage source of 5V, one end of the first capacitor C5 connected to the second pin and the other end of the first capacitor C5 grounded. A positive input terminal 5 of the first operational amplifier U3 is electrically connected to the second pin 2, and a negative input terminal 4 of the first operational amplifier U3 is grounded through a fourth resistor R6, and electrically connected to an output terminal 2 of the first operational amplifier U3 through a fifth resistor R5, wherein the output terminal 2 of the first operational amplifier U3 is configured to output the adjusting trigger signal a to the logic chip U2.

In the present disclosure, when the adjusting switch 121 is in the first gear S1, a voltage value V of the adjusting trigger signal a equals to a voltage value of the constant voltage source Vcc multiplying by a resistance value of the first resistor R9, divided by a sum of the resistance value of the first resistor R9 and a resistance value of the third resistor R8; and wherein when the adjusting switch 121 is in the second gear S2, the voltage value V of the adjusting trigger signal a equals to the voltage value of the constant voltage source Vcc multiplying by a resistance value of the second resistor R4, divided by a sum of the resistance value of the second resistor R4 and the resistance value of the third resistor R8; and wherein when the adjusting switch 121 is in the third gear S3, the voltage value V of the adjusting trigger signal a equals to the voltage value of the constant voltage source Vcc of 5V.

Referring to FIG. 5, the third resistor R8 is connected to the constant voltage source of 5V. When the adjusting switch 121 is adjusted to the first gear S1, only the first pin 1 and the second pin 2 are conductive with each other, that is, the second pin 2 is disconnected to the third pin 3, and the first pin 1 is also disconnected to the third pin 3. At this time, that is, the regulation voltage al, which is the voltage value of the constant voltage source of 5V divided by the third resistor R8 and the first resistor R9, if the resistance value of each of the first resistor R9 and the third resistor R8 is 10 (2, then the regulation voltage al is 2.5V.

When the adjusting switch 121 is adjusted to the second gear S2, only the second pin 2 is conductive with the third pin 3, the second pin 2 is disconnected to the third pin 3, and the first pin 1 is also disconnected to the third pin 3. At this time, the voltage of the second pin 2, that is, the regulation voltage b1, which is the voltage value of the constant voltage source of 5V divided by the third resistor R8 and the second resistor R4, if the resistance value of the third resistor R8 is 10Ω and the resistance value of the second resistor R4 is 5Ω, then the regulation voltage b1 is 0.33V.

When the adjusting switch 121 is adjusted to the third gear S3, the second pin 2 is disconnected to each of the first pin 1 and the third pin 3, that is, there is no conduction between any two pairs of the first pin 1, the second pin 2 and the third pin 3. At this time, the voltage of the second pin 2 is the voltage value 5V of the constant voltage source.

As can be seen from the above, only it is simply following the above connection method to select the first resistor R9, the second resistor R4 and the third resistor R8 with different resistance values, the purpose that the adjusting switch 121 outputs different regulation voltages al at different adjustment levels S can be obtained. Such structure is simple and easy to be implemented.

The first capacitor C5 is configured to perform filtering and absorption on voltage spikes and surge voltages that are generated when the adjusting switch 121 switches the gear S, in order to prevent damage to the first operational amplifier U3 that is on the backend. The first capacitor C5 is further configured to start discharging at the moment when the first operational amplifier U3 is powered off, resulting in reducing a possibility of large voltage pulses output to the logic chip U2, so as to protect the logic chip U2.

The first operational amplifier U3 is used as a voltage follower, and a voltage value of a voltage that is output by the first operational amplifier U3 is exactly the same as that of the regulation voltage b1. At the same time, the first operational amplifier U3 can also serve a purpose of impedance matching, isolating the logic chip U2 from the adjusting switch 121, so as to protect the logic chip U2.

Furthermore, the logic chip U2 is a microcontroller and includes a detection input terminal IN and a driving output terminal OUT. The detection input terminal IN is connected to the output terminal 2 of the first operational amplifier U3 to receive the adjusting trigger signal a, and the driving output terminal OUT is configured to output the intermediate signal b1.

The control peripheral circuit 132 includes: a second operational amplifier U1 and a Metal-Oxide-Semiconductor Field-Effect Transistor (MOSFET) transistor Q1.

A positive input terminal 7 of the second operational amplifier U1 is connected to the driving output terminal OUT of the logic chip U2, and a negative input terminal 6 of the second operational amplifier U1 is grounded through a sixth resistor R3 and connected to the output terminal 1 of the second operational amplifier U1 through a seventh resistor R2. A grid G of the MOSFET transistor Q1 is connected to the output terminal 1 of the second operational amplifier U1, a drain electrode D of the MOSFET transistor Q1 is grounded, and a source electrode S of the MOSFET transistor Q1 is connected to the dimming drive power supply 110.

The dimming drive power supply 110 includes a pair of output terminals (V+, V−) worked in a corresponding driving mode according to the adjusting signal b that is sent by the MOSFET transistor Q1, and output the driving signal Vx corresponding to the driving mode to the light board 30, so that the plurality of lighting beads 20 of the light board 30 works in the corresponding driving mode.

In the present disclosure, the MOSFET transistor Q1 is configured to isolate the logic chip U2 and the dimming drive power supply 110, prevent interference of the current and the voltage between the dimming drive power supply 110 and the logic chip U2, thereby protecting the logic chip U2.

Referring to FIG. 2 and FIG. 5, the adjusting signal b is led out to an outside of the dimming drive power supply 110 through a connecting wire 150, the connecting wire 150 configured to connect with an external control terminal 40, wherein the control terminal 40 controls the driving mode or a working state of the dimming drive power supply 110 through the connecting wire 150, wherein the working state of the dimming drive power supply 110 includes a power configured to control a luminous intensity of the light board 30.

In the present disclosure, the MOSFET transistor Q1 has a very high impedance from the source electrode S to the grid G, which can prevent the voltage of a side of the dimming drive power supply 110 from affecting the logic chip U2. Therefore, when the adjusting switch 121 is failed, or the logic chip U2 is damaged, or when it is necessary to manually control the dimming drive power supply 110 without following the intermediate signal b1 that is output by the logic chip U2, a voltage value on the source electrode S of an output terminal of the MOS transistor Q1 can be adjusted through the control terminal 40, so as to achieve to control the dimming drive power supply 110. At this time, the voltage that is output from the control terminal 40 to the source electrode of the MOSFET transistor Q1 will not have any impact on the logic chip U2.

Figure 6:
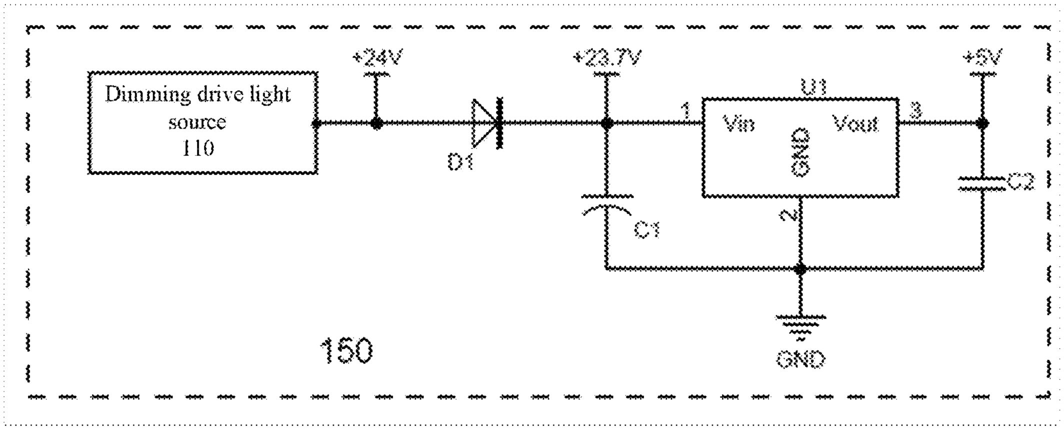
FIG. 6 is a schematic diagram of a voltage conversion module of the LED drive system of the present disclosure.

Finally, referring to FIG. 1 and FIG. 6, the dimming driving power supply 110 is also configured to output a constant voltage Vdd. The LED drive system further includes a voltage conversion module 140 configured to converting the constant voltage Vdd=24V and supplying power to the adjusting module 120 or the control output module 130. In the present disclosure, the voltage conversion module 140 is connected to the dimming drive power supply 110 to obtain electrical energy of the dimming drive power supply 110 and convert the electrical energy into the above constant voltage source Vcc=5V, so as to supply power to the adjusting module 120 or the control output module 130, which can reduce the power supply circuits and lower costs.

Although the features and elements of the present disclosure are described as embodiments in particular combinations, each feature or element can be used alone or in other various combinations within the principles of the present disclosure to the full extent indicated by the broad general meaning of the terms in which the appended claims are expressed. Any variation or replacement made by one of ordinary skill in the related art without departing from the spirit of the present disclosure shall fall within the protection scope of the present disclosure.

What is claimed is:

1. An LED drive system configured to drive and control a light board and comprising:

a dimming drive power supply configured to output at least two drive signals according to its own working driving modes;

an adjusting module having at least two adjusting gears and configured to send an adjusting trigger signal after being shifted to one of the at least two adjusting gears, each of the at least two adjusting gears corresponding to a driving mode;

a control output module configured to output a plurality of adjusting signals corresponding to a plurality of adjusting trigger signals one-to-one based on the plurality of adjusting trigger signals, and send a corresponding adjusting signal in the plurality of adjusting signals to the dimming drive power supply;

the light board electrically connected to the dimming drive power supply; and wherein the dimming drive power supply switches its own driving mode according to the corresponding adjusting signal in the plurality of adjusting signals, and outputs a drive signal corresponding to the driving mode to the light board, so that the light board works in the corresponding driving mode, thereby achieving compatibilities with multiple different dimming driving modes.

2. The LED drive system as claimed in claim 1, wherein the LED drive system further comprises:

a voltage conversion module configured to convert a constant voltage output by the dimming drive power supply and supply power to the adjusting module or the control output module.

3. The LED drive system as claimed in claim 1, wherein the adjusting module comprises:

an adjusting switch comprising the at least two adjusting gears, each of the at least two adjusting gears configured to conduct and connect different circuits, so that the adjusting switch outputs different adjusting voltages; and a first detection following circuit electrically connected between the adjusting switch and the control output module, and configured to perform impedance isolation and filtering on the adjusting voltage to output the adjusting trigger signal.

4. The LED drive system as claimed in claim 3, wherein the control output module comprises:

a logic chip with a preset control strategy, the logic chip comprising an input terminal and an output terminal, wherein the input terminal is configured to receive the adjusting trigger signal, and the output terminal is configured to detect the adjusting trigger signal according to the control strategy and output a corresponding intermediate signal based on a detection result thereof; and a control peripheral circuit configured to receive the intermediate signal, convert the intermediate signal into the adjusting signal, and then send the adjusting signal to the dimming drive power supply.

5. The LED drive system as claimed in claim 4, wherein the control strategy comprises the steps of:

detecting a value of a voltage (V) of the adjusting trigger signal, and comparing the voltage (V) of the adjusting trigger signal with at least two preset threshold voltages (V01, V02, V01≤V02), and outputting the intermediate signal (V11, V12, V13) with different magnitudes based on comparison results;

when V<V01, outputting the intermediate signal V11;

when V01≤V≤V02, outputting the intermediate signal V12; and when V02<V, outputting the intermediate signal V13.

6. The LED drive system as claimed in claim 5, wherein the dimming drive power supply is configured to output three types of driving signals which are a first signal, a second signal and a third signal; the adjusting gear has three positions which are a first gear, a second gear and a third gear;

when the adjusting switch is adjusted to the first gear, the adjusting trigger signal V<V01, the logic chip outputs the intermediate signal V11, and the dimming drive power supply outputs the first signal;

when the adjusting switch is adjusted to the second gear, the adjusting trigger signal V satisfies V01≤V≤V02, the logic chip outputs the intermediate signal V12, and the dimming drive power supply outputs the second signal; and when the adjusting switch is adjusted to the third gear, the adjusting trigger signal V satisfies V02<V, the logic chip outputs the intermediate signal V13, and the dimming drive power supply outputs the third signal.

7. The LED drive system as claimed in claim 5, wherein the adjusting switch comprises a first pin, a second pin and a third pin; and wherein the first detection following circuit comprises:

a first resistor, one end of the first resistor connected to the first pin and the other end of the first resistor grounded;

a second resistor, one end of the second resistor connected to the third pin and the other end of the second resistor grounded;

a third resistor, one end of the third resistor connected to the second pin and the other end of the third resistor connected to a constant voltage source;

a first capacitor, one end of the first capacitor connected to the second pin and the other end of the first capacitor grounded;

a first operational amplifier, wherein a positive input terminal of the first operational amplifier is electrically connected to the second pin, and a negative input terminal of the first operational amplifier is grounded through a fourth resistor, and electrically connected to an output terminal of the first operational amplifier through a fifth resistor; and wherein the output terminal of the first operational amplifier is configured to output the adjusting trigger signal to the logic chip.

8. The LED drive system as claimed in claim 7, wherein the logic chip is a microcontroller and comprises a detection input terminal and a driving output terminal, the detection input terminal connected to the output terminal of the first operational amplifier to receive the adjusting trigger signal, and the driving output terminal configured to output the intermediate signal.

9. The LED drive system as claimed in claim 8, wherein the control peripheral circuit comprises:

a second operational amplifier, wherein a positive input terminal of the second operational amplifier is connected to the driving output terminal of the logic chip, and a negative input terminal of the second operational amplifier is grounded through a sixth resistor and connected to the output terminal of the second operational amplifier through a seventh resistor;

a Metal-Oxide-Semiconductor Field-Effect Transistor (MOSFET) transistor, a grid of the MOS transistor connected to the output terminal of the second operational amplifier, a drain electrode of the MOSFET transistor grounded, and a source electrode of the MOSFET transistor connected to the dimming drive power supply; and wherein the dimming drive power supply comprises a pair of output terminals, the dimming drive power supply worked in a corresponding driving mode according to the adjusting signal that is sent by the MOSFET transistor, and output the driving signal corresponding to the driving mode to the light board through the pair of output terminals, so that the light board works in the corresponding driving mode.

10. The LED drive system as claimed in claim 9, wherein the adjusting signal is led out to an outside of the dimming drive power supply through a connecting wire, the connecting wire configured to connect with an external control terminal, wherein the control terminal controls the driving mode or a working state of the dimming drive power supply through the connecting wire, and the working state comprises a power configured to control a luminous intensity of the light board.

11. The LED drive system as claimed in claim 7, wherein the adjusting gears of the adjusting switch comprises:

the first gear that the first pin is conductive with the second pin, and each of the first pin and the second pin is disconnected to the third pin;

the second gear that the second pin is conductive with the third pin, and each of the second pin and the third pin is disconnected to the first pin;

the third gear that the second pin is disconnected to each of the first pin and the third pin; and wherein when the adjusting switch is in the first gear, a voltage value of the adjusting trigger signal equals to a voltage value of the constant voltage source multiplying by a resistance value of the first resistor, divided by a sum of the resistance value of the first resistor and a resistance value of the third resistor; and wherein when the adjusting switch is in the second gear, the voltage value of the adjusting trigger signal equals to the voltage value of the constant voltage source multiplying by a resistance value of the second resistor, divided by a sum of the resistance value of the second resistor and the resistance value of the third resistor; and wherein when the adjusting switch is in the third gear, the voltage value of the adjusting trigger signal equals to the voltage value of the constant voltage source.

12. The LED drive system as claimed in claim 11, wherein when the adjusting switch is adjusted to the first gear, the dimming drive power supply works in a Digital Addressable Lighting Interface (DALI) dimming mode; when the adjusting switch is adjusted to the second gear, the dimming drive power supply works in a Digital MultipleX RDM (DMX-RDM) dimming mode; when the adjusting switch is adjusted to the third gear, the dimming drive power supply works in a linear dimming mode of 0-10V.

13. An LED lamp comprising an LED drive system as claimed in claim 1; the adjusting module is installed on a housing of the LED lamp for easy adjusting thereof.

* * * * *